Figure 1:
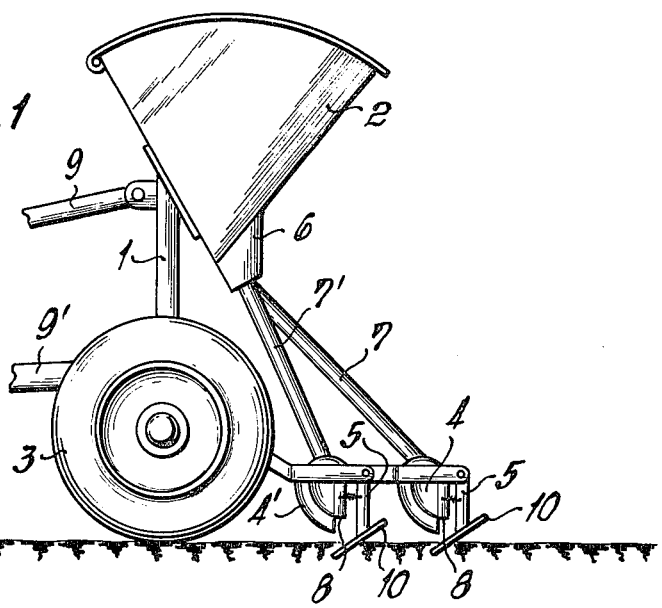

United States Patent [19]

Dreyer

[11] 4,037,545
[45] July 26, 1977

[54] MACHINE FOR DISTRIBUTING MATERIAL

[75] Inventor: Heinz Dreyer, Hasbergen-Gaste, Germany

[73] Assignee: Amazonen-Werke H. Dreyer, Hasbergen-Gaste, Germany

[21] Appl. No.: 567,972

[22] Filed: Apr. 14, 1975

Related U.S. Application Data

[63] Continuation of Ser. No. 422,040, Dec. 5, 1973, abandoned.

[30] Foreign Application Priority Data

Dec. 16, 1972 Germany .................. 2261765

[51] Int. Cl.² .............................................. A01C 5/06
[52] U.S. Cl. ...................................... 111/85; 111/81; 172/198; 172/705
[58] Field of Search ........................ 111/31, 69, 80, 81, 111/83, 86, 7, 14, 15, 52, 79, 85; 172/142, 160, 189, 198, 200, 336, 538, 643, 658, 705, 706, 707, 708, 710

[56] References Cited

U.S. PATENT DOCUMENTS

| 25,430 | 9/1859 | Maize | 172/198 |
|---|---|---|---|
| 435,769 | 2/1890 | Purdy | 111/85 |
| 1,031,167 | 7/1912 | Bushnell | 111/85 |
| 1,202,562 | 10/1916 | Mintern | 111/85 |
| 1,473,297 | 11/1923 | Knight | 111/86 |
| 1,653,786 | 12/1927 | Shell | 111/85 |
| 2,805,613 | 9/1957 | Siems | 172/643 |
| 2,872,883 | 2/1959 | Padrick | 111/86 |
| 3,157,139 | 11/1964 | Spindler | 111/85 X |
| 3,322,203 | 5/1967 | Johnson | 172/142 |
| 3,536,145 | 10/1970 | Clark | 172/710 |

FOREIGN PATENT DOCUMENTS

| 111,462 | 9/1940 | Australia | 111/14 |
|---|---|---|---|
| 1,069,420 | 7/1954 | France | 172/160 |
| 821,861 | 11/1951 | Germany | 111/85 |
| 650,689 | 9/1937 | Germany | 111/85 |
| 1,215,985 | 5/1966 | Germany | 111/85 |
| 1,457,666 | 5/1969 | Germany | 111/85 |
| 2,149,130 | 4/1973 | Germany | 111/85 |
| 70,417 | 10/1927 | Sweden | 172/142 |

Primary Examiner—Edgar S. Burr
Assistant Examiner—Steven A. Bratlie
Attorney, Agent, or Firm—Burgess, Dinklage & Sprung

[57] ABSTRACT

Machine for seeding designed to be pulled by a tractor and outfitted with seed drills for depositing of the seeds in the soil. A furrow opener is mounted forward of the seed drill, and a furrow closer is mounted aft of the seed drill. The furrow closer is mounted on the frame for pivoting in a vertically extending plane behind the seed drill, and comprises a support pivotally mounted on the frame and a hiller mounted on the support by a mounting device for projection of the hiller below the mounting device and into the soil for closing of the furrow. The mounting device is secured to the support by a releasable fastener so that length of the projection of the hiller below the mounting device can be adjusted.

6 Claims, 6 Drawing Figures

MACHINE FOR DISTRIBUTING MATERIAL

This is a continuation, of application Ser. No. 422,040, filed Dec. 5, 1973 now abandoned.

BACKGROUND

The invention relates to a machine for distributing granular or powdered material in rows, which has furrow openers provided with outlet orifices for the material that is to be spread, at least some of said furrow openers being equipped with furrow closers mounted for pivoting in a vertical plane, said furrow closers consisting of supports with hillers provided thereon. The invention is addressed to the problem of enabling the hillers to be adapted to particular seed bed and soil conditions, thereby substantially improving their operation.

German Pat. No. 1,215,985 discloses a machine of the abovedescribed type of construction. This machine has been in practical use for some time. It suffers, however, from the disadvantage that the closing of the seed furrows is poor, especially in heavy soils and rough seed beds, because the hillers do not penetrate deeply enough into the soil and the bearing surfaces of the supports drag clods along with them and this greatly interferes with the furrow closing action. In light soils and in seed beds which are not clean, however, couch grass and other plant trash may be caught on the hillers and on the bearing surface of the supports, thereby pulling the seeds back out of the seed furrows. The wear and tear that is inevitable in the course of time makes the partially unsatisfactory operation described above still worse.

On account of these disadvantages it has proven indispensable under many conditions of operation to equip the machine additionally with seed drags. This, however, again entails the disadvantages that the teeth of the seed drag have to be additionally adjusted in the event of a change of the type of seed and row width, that the solid seed drag cannot adapt to the soil as well as individual prongs can so that the poor operation of the preceding hillers on the supports cannot always be improved as desired, that the drag increases the load on the machine on account of the way in which it is attached to it at a necessarily great distance to the rear of it, and finally this places the center of gravity of the machine, in the case of tractor-mounted machines, toward the rear, so that greater power must be expended in order to lift the machine.

THE INVENTION

These disadvantages are eliminated and the problem is solved in accordance with the invention by the fact that the hillers are adjustable with the aid of a mounting device and are arranged so as to be variable in the length by which they downwardly overreach the supports or the mounting device, as the case may be. First of all this makes it possible to adjust the hillers to an optimum effective length for particular seed bed and soil conditions. Likewise, in the event of wear, the hillers need only be readjusted to regain the optimum length and the optimum angle of incidence with the surface of the soil, it being easily understood that, in a simple pivoting arrangement, changing the lengths of the hillers will also change the angle of incidence.

The invention furthermore provides that a resilient member acting upn the furrow closers is disposed adjustably in a manner wellknown in the art. By this resilient member, which is known in principle from German Pat. No. 1,224,977, the hillers are restrained from jumping upwardly at high operating speeds, the adjustable arrangements serving to adapt the pressure on the hillers to the soil conditions prevailing or to the setting of the working depth of the hillers, as the case may be. The device of attaching weights to the hillers in a known manner serves also for this adjustment. Furthermore, this enables the resilient members to be of a lighter construction.

In a preferred embodiment of the invention the suports consist of flat spring steel disposed edge-up in the pivoting direction. This permits a lateral deflection of the hillers on heavy and lumpy soils while providing a stiffness required in the supports for guiding the hillers in the working direction.

In an additional advantageous embodiment the invention provides that the hillers consist in a known manner of spring steel. Such construction was disclosed in German (GDR) Pat. No. 64,335, where the supports are apparently to consist of relatively thin spring steel wire, resulting in the disadvantage of too little stiffness for heavier soils. If, however, the hillers are made separately from spring steel, they will provide sufficient hiller stiffness of the furrow closers in the direction of travel or operation even though the supports be made of flat spring steel disposed edge-up in the direction of travel.

An equal advantageous effect is produced when the hillers are made in pairs from a single piece of spring steel wire. This construction has the additional advantage of economical manufacture. In this case it is desirable for the hillers to have two straight prongs each joined by a bend at the top to two downwardly directed portions joined together by a bend and serving for fixation to the mounting device. A somewhat greater flexibility is obtained in the hillars by replacing the upper bends with coils. Furthermore, this results in good self-cleaning action in the hillers whenever couch grass or other plant trash has collected on the seed bed.

The invention further provides that the mounting device be in the form of a clamping device of the prior art. This will permit the stepless adjustment of the effective length of the hillers. It will be advantageous in this case for the mounting device optionally to have a mounting bar which laterally overlaps the hiller prongs. This increases the stiffness of the hiller prongs in the direction of operation while retaining the lateral flexibility which permits deflection when large clumps of earth are encountered. If, in accordance with the invention, the mounting bar is provided with a slot at each of its outer ends it is possible to join the individual hillers together in groups or even over the entire working width of the machine. In this manner a complete and stable seed drag is virtually made up of the individual hillers or furrow closers without impairing the movability of the individual prongs.

In an additional preferred embodiment provision is made in accordance with the invention for the downwardly pointing portions of the hillers to have an arcuate configuration centered at least approximately on the pivot point of the hiller assemblies. Thereby the angle of incidence of the hillers to the soil in the working direction remains always the same regardless of the length adjustment of the prongs. It has been found advantageous in practice, especially as regards the self-cleaning of the hillers, for the angle of incidence of the hillers to the soil surface to be smaller than 90° in the direction of travel.

In order to achieve an optimum setting of the hillers for the conditions prevailing in each case, the invention provides that the hillers be mounted on the supports pivotally and for adjustment in different positions, the range of adjustment of the lengths of the hillers extending downwardly beyond the supports or mounting devices in the working position to amount to at least 5 to 15 centimeters.

Lastly, it is provided in a preferred embodiment of the invention that the hillers at least partially form the bearing surface for resting the furrow openers on the soil when the supports are in the depending position as the furrow openers are lowered to the ground. This eliminates the special bearing surface such as the one used in the construction which we described in connection with the state of the prior art for preventing the outlet orifices from clogging when the supports together with the hillers serve to support the furrow openers on the surface of the ground when the latter are lowered.

Thus, the invention is concerned with a machine suitable for seeding, comprising a frame, a hopper mounted on the frame, wheels for transporting of the machine over the ground, a pull rod connected to the forward end of the frame for pulling of the machine, a seed drill mounted on the frame, and a feed tube communicating with the hopper and with the seed drill for delivery of material from the hopper to the seed drill. A furrow opener is mounted forward of the seed drill, and a furrow closure is mounted on the frame for pivoting in a vertically extending plane behind the seed drill. The furrow closer comprises a support pivotally mounted on the frame and a hiller mounted on the support by a mounting device for protection of the hiller below the mounting device and into the soil for closing of the furrow. The mounting device is secured to the support by a releasable device so that the length of the projection of the hiller below the mounting device can be adjusted.

Desirably, adjustable spring means yieldingly urging the furrow closer forward, are provided. Additionally, a weight can be releasably secured to the furrow closer for selective positioning thereof on the furrow closer in a fore and aft direction, in a prior art manner.

Desirably, the support of the furrow closer comprises a flexible length of spring steel extending fore and aft and disposed edge-up in the pivoting direction. The hiller can be a flexible, elongated, spring steel strip, in prior art manner. The hiller can comprise two downwardly projecting fingers formed from a single piece of flexible spring steel strip. The fingers can be joined by a U-shaped section of the steel strip, and the upright part of the U-shaped section can be clamped by the mounting device. The fingers can be joined to the uprights of the U-shaped section at the top of the hiller by coil sections of the steel strip.

In a preferred embodiment, the mounting device comprises a bar disposed behind the hiller and extending lateraly beyond the fingers of the hiller. The U-shaped bend can be arched to provide the U-shaped bend concave when viewed from the forward end of the machine, and the hiller can be clamped on the mounting device at the arched portion.

The frame of the machine can be movable so that the furrow opener and furrow closer can be lowered and raised to, respectively, penetrate the ground with the furrow opener and raise the furrow opener and furrow closer from the ground, while the pivot mounting of the hiller on the support is such that in the raised position, the furrow closer is disposed beneath the furrow opener so that the furrow closer provides support for the furrow opener when the furrow opener and furrow closer are lowered.

EMBODIMENTS

Figure 2:
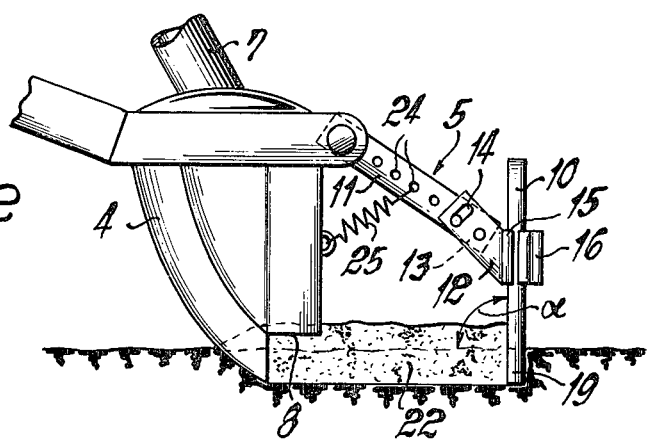
Figure 3:
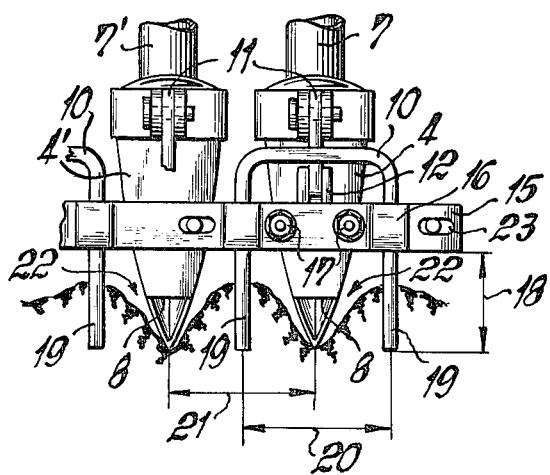
Figure 4:
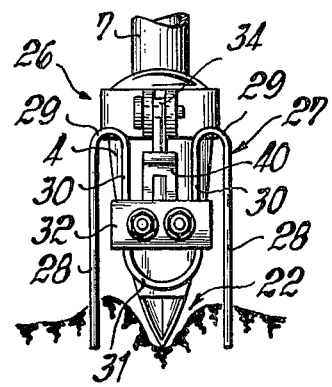
Figure 5:
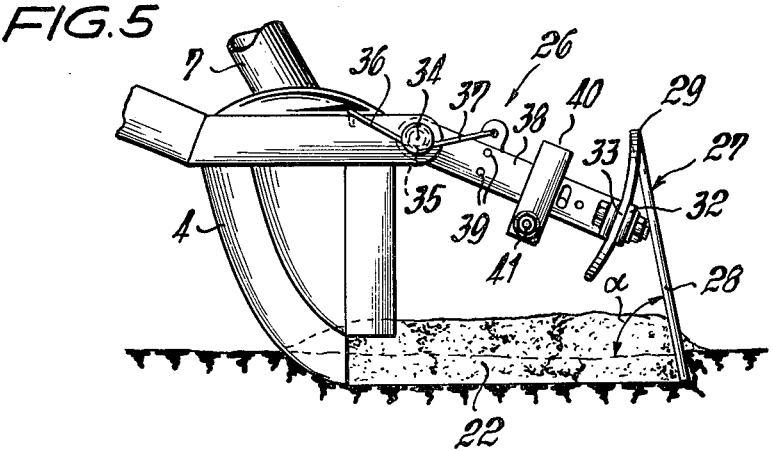
Figure 6:
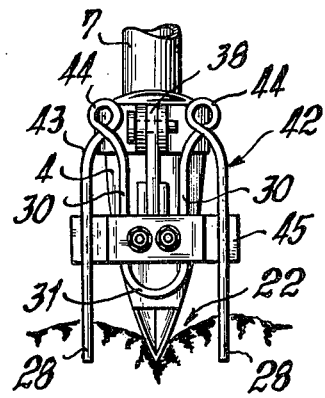

The invention will be further explained hereinafter with the aid of the embodiments represented in the appended drawings, wherein;

FIG. 1 is a side elevational view of the machine of the invention,

FIG. 2 is also a side elevational view on an enlarged scale of a furrow opener of the machine with a hiller in the rearwardly pivoted working position, FIG. 3 represents the construction of FIG. 2 showing an additional furrow opener in a rear elevational view, FIG. 4 is a rear elevational view of the same furrow opener with a different hiller, FIG. 5 is a side elevational view of the construction represented in FIG. 4, and FIG. 6 is a rear elevational view of the same furrow opener with an alternative hiller.

The machine consists of a frame 1, the hopper 2, the running wheels 3 and the furrow openers 4, 4', which are disposed movably in a vertical plane on frame 1 and on which the hillers are mounted also movably in a vertical plane. To these furrow openers 4, 4', the material in the hopper is delivered during operation through the metering mechanism 6, which is not shown in detail, and the feed tubes 7, 7', and passes through the outlet orifices 8 in the furrow openers into the furrows opened in the soil.

The machine is furthermore attached to a tractor (not shown) by means of the links 9, 9', and is in a position in which the depending furrow closers 5 are already in contact with the ground through a portion of their hillers 10 and, as the lowering action continues, will support the furrow openers on the ground so that the outlet orifices 8 will not become plugged with soil.

As shown in FIGS. 2 and 3, each furrow closer 5 consists essentially of the support 11 made of flat spring steel disposed edge up and the hiller 10 which is fastened to the support 11 by means of the mounting device 12. A slot 14 is provided in the foot 13 of the mounting device 12 so that the angle of incidence α of the hiller 10 to the soil in the working direction may be varied. The largest possible angle of incidence α is represented in FIG. 2.

To the foot 13 of the mounting device 12 the mounting bar 15 is welded, against which the hiller 10 is pressed by means of the clamping plate 16 and the bolts 17, the length 18 by which hiller 10 extends downwardly beyond the mounting device 12 being stoplessly adjustable.

This hiller 10 is made in one piece and has the two prongs 19 which are set apart laterally by the distance 20. In cases where this distance 20 is approximately equal to the row width 21 of the furrow opener 4,4', only the furrow openers 4 which are set further rearwardly have to be equipped with the furrow closers 5 because then every prong 19 will push toward both sides the earth thrown up by the furrow openers 4,4', thereby closing the furrows 22. To prevent the plugging of the outlet orifices 8 in the short furrow openers 4', the latter need only be equipped with simple supports.

As furthermore shown by FIG. 3, the mounting bars 15 are provided at their outer ends extending beyond the prongs 19 with slots 23 which permit the furrow closers 5 to be linked together.

Lastly, in the support 11 there are provided the bores 24 into which the resilient member 25 can be hooked as desired to vary the pressure on the furrow closers 5.

In FIGS. 4 and 5 there is shown a different furrow closer 26 with a hiller 27 which is made in one piece from spring wire and whose prongs are joined at the upper ends by bends 29 to two downwardly directed portions 30 which in turn are joined together by a bend 31. At the same time the two downwardly directed portions 30 serve for fixation to the mounting device 32 and are curved in such a manner that the center portion of the arc 33 is in line with the pivot line of the furrow closer 26.

The arc 33 provides a U-shaped section arched to provide the U-shape concave when viewed from the forward end of the machine. At this pivot point 34 there is also attached the resilient member 35 whose one leg 36 reaches over the furrow opener 4 while the other leg 37 may be inserted into one of the bores 39 provided in support 38, as desired. Furthermore, the weight 40 is clamped on the support 38 by means of the bolt 41, so that it can be locked in different positions on the support.

FIG. 6 shows a similar furrow closer 42. The difference consists merely in the fact that the two straight prongs 28 of the hillers 43 are joined through the coils 44 to the downwardly directed portions 30 and that the mounting device 32 has a mounting bar 45 which extends laterally beyond the prongs 28.

What is claimed is:

1. Machine for distributing granular or powdered material and suitable for being pulled by a tractor, comprising a frame, a hopper mounted on the frame, furrow openers mounted on the frame, material conveying tubes connected to the furrow openers and the hopper for the transport of material from the hopper to the furrow openers, the furrow openers having outlet orifices for delivery of said material to the soil, furrow closers connected to the furrow openers for pivoting in vertically extending planes with respect to and behind the furrow openers, each furrow closer comprising a support pivotally connected to the furrow opener and a hiller mounted on the support by a mounting device for projection of the hiller below the mounting device and into the soil for closing of a furrow, the hiller being secured to the mounting device by a releasable fastener so that the length of the projection of the hiller below the mounting device can be adjusted, the furrow openers being movable between a lower position and an upper position with resultant movement of the furrow closers to, respectively, penetrate the ground and raise from the ground, the pivot mounting of the furrow closers and the length of the supports, and the adjustability of the adjustable mounting of the hillers on the mounting devices being such that the hillers can be disposed on the supports so that in the raised position the hillers are disposed beneath the furrow openers so that when the furrow openers and furrow closers are lowered, the hillers contact the ground and support the furrow openers above the ground so that the outlet orifices do not become plugged with soil, and while in the working position the hillers are the only parts of the furrow doses which contact the ground the hiller being formed of a single piece of flexible spring steel strip and consisting essentially of two downwardly projecting fingers, a U-shaped section, and sections joining the free ends of the U-shaped section to the upper ends of the fingers, said U-shaped section being arched to provide the U-shaped section concave when viewed from the forward end of the machine, the hiller being clamped on the mounting device at the arched portion.

2. Machine according to claim 8, the mounting device comprising a bar disposed behind the hiller and extending laterally beyond the fingers of the hiller.

3. Machine according to claim 2, the bar having slots at its outer ends.

4. Machine according to claim 1, said sections of the hillers each comprising a coil.

5. Machine according to claim 1, the support comprising a flexible length of spring steel which with the hiller in the working position extends fore and aft, and which is disposed edge-up in the pivoting direction.

6. Machine according to claim 1, and adjustable spring means yieldingly urging the furrow closer forward.

* * * * *